F. T. SNYDER.
BAKING APPARATUS.
APPLICATION FILED JULY 30, 1919.
1,395,211. Patented Oct. 25, 1921.
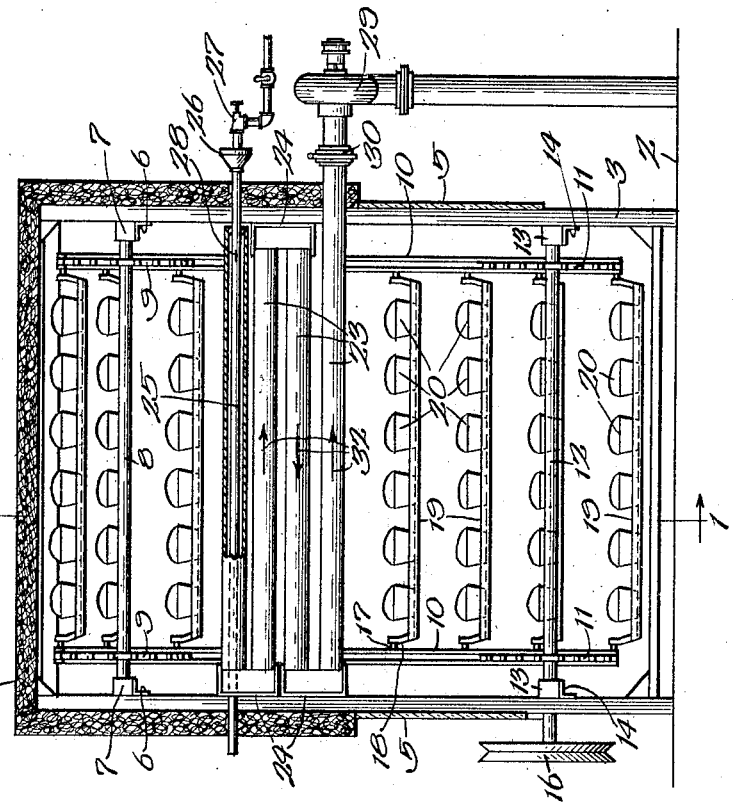
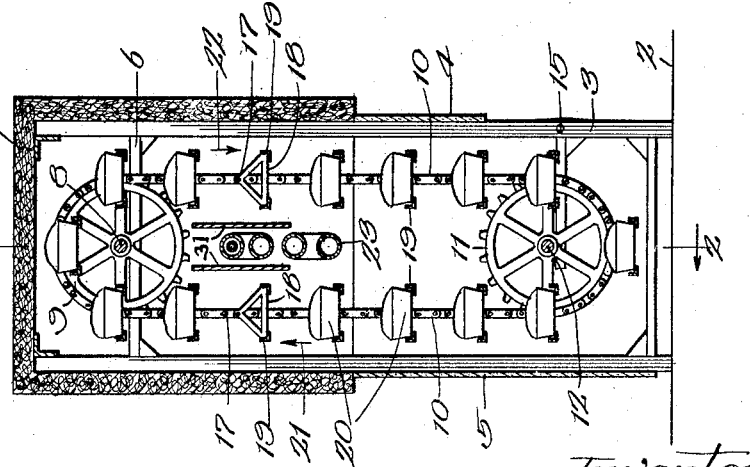
Inventor:
Frederick T. Snyder.

UNITED STATES PATENT OFFICE.

FREDERICK T. SNYDER, OF OAK PARK, ILLINOIS, ASSIGNOR TO S. D. FLOOD, OF CHICAGO, ILLINOIS.

BAKING APPARATUS.

1,395,211. Specification of Letters Patent. Patented Oct. 25, 1921.

Application filed July 30, 1919. Serial No. 314,253.

*To all whom it may concern:*

Be it known that I, FREDERICK T. SNYDER, citizen of the United States, residing at Oak Park, in the county of Cook and State of Illinois, have invented a certain new and useful Improvement in Baking Apparatus, of which the following is a full, clear, concise, and exact description.

My invention relates to baking apparatus having a variety of uses among which is the baking of bread.

The invention has several objects and a large number of advantages. It employs a chamber in which the baking is done and an arrangement whereby dough or rather material which is to be baked may be proofed or finally raised or otherwise treated while in the apparatus, the heat thereof being employed in such proofing or treatment. In the preferred embodiment of the invention the dough or other material is baked in one journey thereof through the apparatus and in which journey the so-called proofing or other treatment may also be effected if desired.

In carrying out various objects of my invention the interior of the baking chamber is excluded from communication with the exterior air except at its bottom where the material to be baked enters and leaves the chamber. The air within the baking chamber is, therefore, very slowly, if at all, changed so that it may ultimately become saturated with the essential oils that flavor the bread and also with moisture so that none of the essential oils nor the moisture contained in the dough entering the chamber will be given up by the bread. The bread will remain fresh longer than would be the case where moisture is extracted in the baking operation, and will retain its aroma and flavor due to its retention of the essential oils. If desired, the air within the baking chamber may be initially saturated with moisture from water placed in some of the baking pans that are passed through the heating chamber.

The invention in all of its features will be fully set forth by reference to the accompanying drawings in which Figure 1 is a sectional view on line 1—1 of Fig. 2 and Fig. 2 is a sectional view on line 2—2 of Fig. 1.

Like parts are indicated by similar characters of reference throughout the different figures.

The invention will be specifically described in connection with its use in baking bread, though it is to be understood that the invention is not to be restricted to any use.

My device is a hollow column or a columnar-shaped inclosure, of which inclosure the heated upper part is a baking chamber, and of which inclosure the lower part is a proofing chamber kept warm by heat coming from the upper chamber, and also provided with an opening for putting in and taking out the loaves. The two are continuous with each other, and there is an endless carrier traversing both.

The baking chamber 1 is closed at its top and sides and is open at its bottom. The walls of this chamber are constructed to prevent material radiation of heat therethrough and to avoid leakage as far as possible. The chamber is preferably higher than it is long and longer than it is wide. This chamber is elevated or spaced apart from the floor of other support 2 by means of its upright legs 3 which are preferably continued up into the chamber to constitute a part of its structural framework. An apron 4, preferably of glass, is at the side of the apparatus where the material to be baked is introduced, this apron extending from the chamber 1 part way toward the floor to leave sufficient open space between its bottom edge and the floor through which the material to be baked is passed into and removed from the apparatus. Other aprons 5, on the other sides of the apparatus, also preferably of glass, extend downwardly from the chamber 1. Proofing of the dough is observed through the aprons or transparent walls of the proofing chamber. The horizontal transverse bases 6 within and at the ends of the chamber are secured to the legs 3 and support the bearings 7 for the horizontal idler shaft 8 that extends longitudinally of the structure and upon the ends of which shaft are fixed two idler sprocket wheels 9. Upright driven sprocket chains 10 are in mesh with these sprocket wheels that are in the upper bights of the chains. Chain driving sprocket wheels 11 are in mesh with said chains and are disposed in the lower bights thereof. The wheels 11 are fixed upon the lower horizontal driving shaft 12 mounted in bearings 13 supported upon the inner ends of the swinging horizontal transverse arms 14 which are pivotally secured at their outer ends to two of the legs 3 at 15. The bearings may be bushed with solid hard graphite that is self lubricating at all temperatures to avoid the use of oil. The lower shaft is thus the driving shaft and the upper shaft is an idler, the latter not having to pass through the baking chamber walls in order to have driving connection with the power transmitting means. The driving shaft 12, together with the sprocket wheels 11 thereon and the lower bights of the sprocket chains, are thus arranged to float, being movable up and down as the chains vary in length when the apparatus is being raised to or lowered from desired baking heat. The tendency of the sprocket chains to depart outwardly from the pitch circles is also compensated for by this arrangement. The shaft 12 is slowly driven by any suitable means, as for example by the driving pulley 16 fixed thereon.

For the baking of bread there are provided horizontally alined supporting pivot pins 17 upon the two chains, these pins being desirably spaced about a foot apart on each chain. A tray or carrier is mounted to be horizontal upon each pair of co-axial pivot pins upon which it swings at the chain bights to maintain it horizontal. The trays are preferably formed of triangular end frames 18 joined by longitudinal horizontal angle irons 19 arranged to have their sides horizontal and upright, the horizontal sides constituting ledges upon which baking pans 20, containing the dough to be baked, are disposed. The chains are so driven that they move downward where nearer the glass apron 4, consequently moving up into the baking chamber where they are nearer the rear apron 5, all as indicated by the arrows 21, 22. The dough laden baking pans are placed upon each tray when it is sufficiently below the apron 4, the minor heat in the space between the aprons 4 and 5 quickening the raising or proofing of the bread, this proofing being preferably entirely completed before the dough is introduced into the baking chamber. The dough and the bread resulting therefrom are carried by the conveying mechanism through an orbit partially inclosed by the baking chamber and partially inclosed by the proofing chamber, both of these chambers serving to inclose said orbit. The source of heat that brings the baking chamber to baking heat and the proofing chamber to proofing heat is inclosed by this orbit as will appear. In the equipment illustrated it would require an hour and a quarter to pass each tray from its loading point just below the apron 4 back to this point where the baked bread is unloaded from the tray. This allows sufficient time for the dough to raise or proof before entering the baking chamber, and also allows sufficient time within the baking chamber to bake the dough into bread.

The heat is preferably furnished to the equipment with the aid of heating pipes 23, superimposed upon each other, and whose bores are joined by the hollow heads 24 to form a sinuous or zig-zag shaped heat conducting passage. These pipes are located within the orbit of travel of the loaves and above the open bottom of the baking chamber so that the source of heat which they constitute is located in the trapped space within said chamber. A gas pipe 25 is within and extends along the uppermost pipe 23, this gas pipe having one end extending through one head 24 where it is open to receive air and having its other end extending through another head 24 where the gas pipe is supplied with gas. A gas burner 26 is located at the latter end of the gas pipe 25, and air may also be admitted at this burner to this pipe. Primary air enters the gas pipe through the burner or mixer as usual, secondary air passing through the gas pipe and being heated by the surrounding flame preparatory to its intermixture with the gas. A gas valve 27 regulates the supply of gas to the burner 26. The gas and air mix in the gas pipe 25, products of combustion passing through the lateral holes 28 in this pipe into the sinuous heating passage afforded by the heating pipes 23 and the heads 24 joining the bores of these pipes, these products of combustion issuing through the outer end of the lowermost heating pipe 23. Heat is gradually given up by the products of combustion as they travel toward their outlet where they emerge cooled below baking temperature. A suction fan 29 may be employed to promote the downward flow of the products of combustion through the piping 23, 24, this flow being regulable by a valve 30.

The piping 23, 24 is arranged between and spaced apart on both sides from the shields 31. The shields 31, made preferably of sheet iron one-sixteenth of an inch in thickness, direct radiant heat to the bottoms of the pans, the bread thus being cooked better than hitherto. These shields project above the source of heat to direct the heat therefrom to the pans, the portions of the dough or bread not covered by the pans being shielded from this radiant heat whereby the crust of the bread is uniformly browned. The inner surface portions of the baking chamber are desirably formed upon thick walls of a non-metallic mineral substance such as asbestos to avoid undue expansion or contraction while enabling it to be properly subject to the heat without impairing the effectiveness of the heat.

By arranging the movement of the products of combustion in a downward direction, the travel of the hotter and lighter portions of the gases of combustion is retarded by gravitation, until they have given up their heat also and so become as heavy as the cooler gases. Very economical heating is thus secured. None of the gases of combustion come in contact with the bread being baked, there being no passage between the piping 23, 24 and the interior of the baking chamber 1 to spoil its flavor and aroma. By adjusting the relative amount of the air supplied at the open end of pipe 25 and at the burner 26, the burning of the gas can be distributed evenly through the length of the burner pipe 25, in this way heating the uppermost heating pipe 23 uniformly along its length. As the gases of combustion pass alternately across the baking chamber in opposite directions, as shown by the arrows 32, the heat is uniformly distributed across the baking chamber and is progressively increased upwardly in the baking chamber.

The dough in the pans that move from the receiving place below the apron 4 prior to its receipt within the baking chamber, is subject to the heat coming downwardly from the lowermost heating pipe 23 and the interior of the baking chamber 1, the heat being partially temporarily trapped between the aprons 4 and 5. The complete raising of the dough results from this heat which puts the dough in finished condition for baking. Each tray takes about forty-five minutes to pass through the baking chamber and emerges as completely baked bread on the down going side of the chains. The emerging bread gives out heat to the upgoing dough in this way, thereby helping to raise or proof it. As the bread comes down it enters layers of air in the baking chamber of progressively lower temperatures, and gives up much of its heat to this cooler air, which in turn, transfers this heat to the fresh pans of dough coming up on the other side, thereby conserving much of the heat that is lost in the usual form of baking chamber from which the bread is taken at its highest temperature. As the bread passes practically entirely around the burner pipes, all sides and ends of the loaves, as well as the tops and bottoms thereof, are uniformly exposed to the radiated heat of the hottest topmost heating pipe 23. The result is a uniform brown crust over the entire surfaces of the loaves.

As very little heat is lost in the baking chamber by radiation or leakage, the temperature within the baking chamber is very sensitive to adjustment. A small variation in the supply of gas will make a large difference in the maximum temperature in the top of the baking chamber. The amount and color of the crust is determined by this maximum temperature. By observing the appearance of the loaves as they emerge from the baking chamber, the gas valve 27 can be adjusted to give just the color desired and as the baking chamber is a continuously operating one, this desired result will be repeated indefinitely.

The flow of heat into the loaves depends mainly on their size as the better heat conductivity of heavier loaves is about offset by the greater amount of heat required per cubic inch to bring the heavier loaves up to baking temperature. Therefore the speed of chain travel employed in the baking of one kind of dough thoroughly to the center of the loaves will bake any other kind of a different degree of raising equally well. In this way variations in the raising of the bread are automatically compensated for without requiring personal attention. As each tray preferably holds from eight to twelve loaves and three or four trays can be changed at once, the attention of the baker is only required at long intervals, permitting him to be engaged in other work at other times.

In baking fruit and custard pies, the accessibility to the trays permits the liquid filling of the pies being put in after the pie pans have been placed on the trays, which reduces the loss from spilling.

While gas has been mostly used to heat the heating pipes, it is also practical to heat these pipes with liquid fuel or by introducing superheated steam, or by introducing electric resistance heaters in place of the heating pipes, arranged in the same vertical plane.

It will be observed that the air in the baking chamber is not materially replaced, wherefore it may become saturated with moisture and the essential oils in the dough so that when the dough enters the baking chamber it will not give up these ingredients which are so essential in maintaining the bread sweet, fresh, and of the proper aroma. In the prior baking processes about five per cent. of the moisture is given up by the dough that is being baked. The heating agency is totally excluded from communication with the interior of the baking chamber so that no injurious or objectionable substances are transferred from the source of heat to the bread that is being baked. The fresh dough that is being elevated into the baking chamber tends to cool off the air in the baking chamber. This cooled air flows downwardly past the bread that is being elevated on the rising side. The heated air flows upwardly past the descending loaves. In this way the tendency is to keep the baking conditions uniform, the cooled air and the heated air seeking their proper relation to the departing bread.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Baking apparatus including a baking chamber having an entrance opening in its bottom and normally permanently closed from direct communication with the external air at all other portions thereof; a source of baking heat positioned above said entrance opening; and a proofing chamber located below said source of baking heat and below said baking chamber and normally in communication with the baking chamber through the entrance opening and forming a continuation of the latter and normally permanently closed from communication with the external air except at its bottom.

2. Baking apparatus including a baking chamber having an entrance opening in its bottom and normally permanently closed from direct communication with the external air at all other portions thereof; a source of baking heat positioned above said entrance opening; and a proofing chamber located below the baking chamber and said source of baking heat and normally in communication with the baking chamber and forming a continuation thereof through the entrance opening of the latter and normally permanently closed from communication with the external air except at its bottom.

3. Baking apparatus including a baking chamber having an opening in its bottom and normally permanently closed from direct communication with the external air at all other portions thereof; a source of baking heat positioned above said opening; a proofing chamber located below said source of baking heat and normally in direct communication with the baking chamber and forming a continuation thereof, through the entrance opening of the latter and normally permanently closed from communication with the external air except at its bottom; carriers for the material to be baked; and conveying mechanism effecting the travel of said carriers through an orbit inclosed by the baking and proofing chambers, said carriers being moved very slowly and being comparatively far from the walls of the channels so that the air in the baking chamber is not disturbed.

4. Baking apparatus including a baking chamber having an entrance opening in its bottom and normally permanently closed from direct comunication with the external air at all other portions thereof; a source of baking heat positioned above said entrance opening; a proofing chamber located below the baking chamber and said source of baking heat and normally in communication with the baking chamber and forming a continuation thereof, through the entrance opening of the latter and normally permanently closed from communication with the external air except at its bottom; carriers for the material to be baked; and conveying mechanism effecting the travel of said carriers through an orbit inclosed by the baking and proofing chambers under conditions of speed and proportion of parts calculated to affect as little as possible disturbance of the hot air in the upper chamber.

5. Baking apparatus including a baking chamber having an entrance opening in its bottom and normally permanently closed from direct communication with the external air at all other portions thereof; a source of baking heat positioned above said entrance opening; a proofing chamber located below said source of baking heat and normally in communication with the baking chamber and forming a continuation thereof through the entrance opening of the latter and normally permanently closed from communication with the external air except at its bottom; carriers for the material to be baked; and conveying mechanism effecting the travel of said carriers through an orbit inclosed by the baking and proofing chambers, said source of heat being inclosed by said orbit.

6. Baking apparatus including a baking chamber having an entrance opening in its bottom and normally permanently closed from direct communication with the external air at all other portions thereof; a source of baking heat positioned above said entrance opening; a proofing chamber located below the baking chamber forming a continuation thereof and said source of baking heat and normally in communication with the baking chamber through the entrance opening of the latter and normally permanently closed from communication with the external air except at its bottom; carriers for the material to be baked; and conveying mechanism effecting the travel of said carriers through an orbit inclosed by the baking and proofing chambers, said source of heat being inclosed by said orbit.

7. Baking apparatus including a baking chamber having an entrance opening in its bottom and normally permanently closed from direct communication with the external air at all other portions thereof; a source of baking heat positioned above said entrance opening; a proofing chamber below; carriers for the material to be baked; conveying mechanism effecting travel of said carriers through an orbit partially inclosed by the baking chamber and through said proofing chamber, said source of heat being inclosed by said orbit; and upright shields between which the source of heat is disposed, said shields serving to protect the sides of the loaves from direct heat.

8. Baking apparatus including a baking chamber having an entrance opening in its bottom and normally permanently closed from direct communication with the external air at all other portions thereof; a source of baking heat positioned above said entrance opening; a proofing chamber located below said source of baking heat and normally in communication with the baking chamber through the entrance opening of the latter and normally permanently closed from communication with the external air except at its bottom, said proofing chamber and baking chamber being continuations of each other; carriers for the material to be baked; conveying mechanism effecting the travel of said carriers through an orbit inclosed by the baking and proofing chambers, said source of heat being inclosed by said orbit; and upright shields between which the source of heat is disposed.

9. Baking apparatus including a baking chamber having an entrance opening in its bottom and normally permanently closed from direct communication with the external air at all other portions thereof; a source of baking heat positioned above said entrance opening; a proofing chamber located below the baking chamber and said source of baking heat and normally in direct communication with the baking chamber through the entrance opening of the latter and normally permanently closed from direct communication with the external air except at its bottom; carriers for the material to be baked; conveying mechanism effecting the travel of said carrier through an orbit inclosed by the baking and proofing chambers, said carriers being arranged to disturb as little as possible the air in the baking chamber, said source of heat being inclosed by said orbit; and upright shields between which the source of heat is disposed.

10. Baking apparatus including a baking chamber having an entrance opening in its bottom and normally permanently closed from direct communication with the external air at all other portions thereof; a source of baking heat positioned above said entrance opening; a proofing chamber; carriers for the material to be baked; conveying mechanism effecting travel of said carriers without disturbing the air through an orbit partially inclosed by the baking chamber, said source of heat being inclosed by said orbit; and upright shields between which the source of heat is disposed and projecting above said source of heat.

11. Baking apparatus including a baking chamber having an entrance opening in its bottom and normally permanently closed from direct communication with the external air at all other portions thereof; a source of baking heat positioned above said entrance opening; a proofing chamber located below said source of baking heat and normally in communication with the baking chamber through the entrance opening of the latter and normally permanently closed from direct communication with the external air except at its bottom; carriers for the material to be baked; conveying mechanism effecting the travel of said carriers without disturbance through an orbit inclosed by the baking and proofing chambers, said source of heat being inclosed by said orbit; and upright shields between which the source of heat is disposed and projecting above said source of heat.

12. Baking apparatus including a baking chamber having an entrance opening in its bottom and normally permanently closed from direct communication with the external air at all other portions thereof; a source of baking heat positioned above said entrance opening; a proofing chamber located below the baking chamber and said source of baking heat and normally in direct communication with the baking chamber through the entrance opening of the latter and normally permanently closed from direct communication with the external air except at its bottom; carriers for the material to be baked, said carriers being arranged to move at a distance from the walls; conveying mechanism effecting the travel of said carriers through an orbit inclosed by the baking and proofing chambers, said source of heat being inclosed by said orbit; and upright shields between which the source of heat is disposed and projecting above said source of heat.

13. Baking apparatus including a baking chamber having an entrance opening in its bottom and normally permanently closed from direct communication with the external air at all other portions thereof; a source of baking heat positioned above said entrance opening; a proofing chamber located below said source of baking heat and normally in communication with the baking chamber through the entrance opening of the latter and normally permanently closed from communication with the external air except at its bottom, the proofing chamber being a continuation of the baking chamber; sprocket wheels within the baking chamber; sprocket wheels below the baking chamber; sprocket chains upon said wheels; and carriers for the material to be baked supported upon said sprocket chains.

14. Baking apparatus including a baking chamber having an entrance opening in its bottom and normally permanently closed from direct communication with the external air at all other portions thereof; a source of baking heat positioned above the entrance opening; a proofing chamber located below the baking chamber and said source of baking heat and normally in communication with the baking chamber through the entrance opening of the latter and normally permanently closed from communication with the external air except at its bottom, the walls of the baking and proofing chambers being continuous; sprocket wheels within the baking chamber; sprocket wheels below the baking chamber; sprocket chains upon said wheels; and carriers for the material to be baked supported upon said sprocket chains.

15. Baking apparatus including a baking chamber having an entrance opening in its bottom and normally permanently closed from direct communication with the external air at all other portions thereof; a source of baking and crusting heat positioned above said entrance opening; a proofing chamber located below said source of baking heat and normally in communication with the baking chamber through the entrance opening of the latter and normally permanently closed from communication with the external air except at its bottom; sprocket wheels within the baking chamber; sprocket wheels below the baking chamber; sprocket chains upon said wheels; a support for the lower sprocket wheels permitting the raising and lowering thereof in response to changes in the length of the chains; and carriers for the material to be baked supported upon said sprocket chains, said carriers being of a size to permit them to move well away from the walls of the proofing and baking chambers.

16. Baking apparatus including a baking chamber having an entrance opening in its bottom and normally permanently closed from direct communication with the external air at all other portions thereof; a source of baking heat positioned above the entrance opening; a proofing chamber located below the baking chamber and said source of baking heat and normally in communication with the baking chamber through the entrance opening of the latter and normally permanently closed from communication with the external air except at its bottom; sprocket wheels within the baking chamber; sprocket wheels below the baking chamber; sprocket chains upon said wheels; a support for the lower sprocket wheels permitting the raising and lowering thereof in response to changes in the length of the chains; and carriers for the material to be baked supported upon said sprocket chains, said carriers being adapted to move without air disturbance through the air chambers.

17. Baking apparatus including a baking chamber having an entrance opening in its bottom and normally permanently closed from direct communication with the external air at all other portions thereof; a source of baking heat positioned above said entrance opening; and a proofing chamber located below the baking chamber and said source of baking heat and normally in communication with the baking chamber through the entrance opening of the latter and normally permanently closed from communication with the external air except at its bottom, the proofing chamber being inclusive of a transparent wall portion through which the proofing may be observed, the proofing chamber and the baking chamber being respective ends of a columnar inclosure.

18. Baking apparatus including a baking chamber having an entrance opening in its bottom and normally permanently closed from direct communication with the external air at all other portions thereof; a source of baking heat positioned above said entrance opening; a proofing chamber located below said source of baking heat and normally in communication with the baking chamber through the entrance opening of the latter and normally permanently closed from communication with the external air except at its bottom; carriers for the material to be baked; conveying mechanism for causing said carriers to travel through an orbit inclosed by the baking and proofing chambers, the walls of the chambers being arranged with relation to their carriers to enable the latter to move without disturbance of the air; and means below said source of heat for driving said conveying mechanism.

19. Baking apparatus including a baking chamber having an entrance opening in its bottom and normally permanently closed from direct communication with the external air at all other portions thereof; a source of baking heat positioned above said entrance opening; a proofing chamber located below the baking chamber and said source of baking heat and normally in communication with the baking chamber through the entrance opening of the latter and normally permanently closed from communication with the external air except at its bottom; carriers for the material to be baked; conveying mechanism for causing said carriers to travel through an orbit inclosed by the baking and proofing chambers; and means below said source of heat for driving said conveying mechanism, provision being made in the conveying mechanism to allow for expansion of such mechanism under heat.

20. Baking apparatus including a baking chamber having an entrance opening in its bottom and normally permanently closed from direct communication with the external air at all other portions thereof; a source of baking heat positioned above said entrance opening, inner surface portions of the baking chamber being formed upon a non-metallic mineral substance; and a proofing chamber located below said source of baking heat and normally in communication with the baking chamber through the entrance opening of the latter and normally permanently closed from direct communication with the external air except at its bottom, the baking chamber and the proofing chamber being continuations of each other.

21. Baking apparatus including a baking chamber having an entrance opening in its bottom and normally permanently closed from direct communication with the external air at all other portions thereof; a source of baking heat positioned above said entrance opening, inner surface portions of the baking chamber being formed upon a non-metallic mineral substance; and a proofing chamber located below the baking chamber and said source of baking heat and normally in communication with the baking chamber through the entrance opening of the latter and normally permanently closed from communication with the external air except at its bottom, the proofing chamber and the baking chamber being directly continuous.

22. In a device for continuous proofing and baking, in combination, an upright inclosed column, heating means in the upper part of said column for keeping said upper part at baking temperature, there being but one opening in said column and that being below the heating means, said upper part being a baking chamber and said lower part being a continuation of the upper part and being warmed by heat from the upper part to proofing temperature, thereby forming a proofing chamber, and means for carrying loaves from the opening through the proofing chamber, and into and through the baking chamber.

23. In a device for proofing, baking and evenly crusting bread, in combination, an upper chamber, a baking and crusting heater in said chamber, a lower chamber for proofing dough immediately before baking, said lower chamber being a continuation of the upper, the two forming a columnar inclosure, and endless means for carrying loaves through the proofing chamber into the baking chamber, over the crusting means and through and out of the baking chamber, said means provided with loaf bearing trays moving slowly at a considerable distance from the walls, whereby disturbance of the heated air in the upper chamber is avoided, there being but one opening and that in the lower part of the lower chamber.

In witness whereof, I hereunto subscribe my name this 25th day of July, A. D. 1919.

FREDERICK T. SNYDER.